United States Patent
Li et al.

(10) Patent No.: US 10,612,869 B2
(45) Date of Patent: Apr. 7, 2020

(54) MANAGING A PASSIVATION LAYER OF A HEAT EXCHANGER

(71) Applicant: Robert Bosch GmbH, Stuttgart (DE)

(72) Inventors: Xiaobai Li, Cupertino, CA (US); Alessandro Pecenko, Heeten (NL); Wolf Schmid, Arnhem (NL); Gert-Jan Feberwee, Deventer (NL); Martin Rohaan, Enter (NL)

(73) Assignee: Robert Bosch GmbH, Stuttgart (DE)

( * ) Notice: Subject to any disclaimer, the term of this patent is extended or adjusted under 35 U.S.C. 154(b) by 765 days.

(21) Appl. No.: 15/191,861

(22) Filed: Jun. 24, 2016

(65) Prior Publication Data

US 2017/0370662 A1  Dec. 28, 2017

(51) Int. Cl.
*F24H 8/00* (2006.01)
*F28G 13/00* (2006.01)
*F28C 1/16* (2006.01)

(52) U.S. Cl.
CPC .................... *F28G 13/00* (2013.01)

(58) Field of Classification Search
CPC ... C23C 8/10–18; F24H 8/006; F24H 9/0047; F24H 9/2007
See application file for complete search history.

(56) References Cited

U.S. PATENT DOCUMENTS

| | | | |
|---|---|---|---|
| 2005/0133021 A1* | 6/2005 | Kobayashi | F24H 8/006 126/350.1 |
| 2014/0060458 A1 | 3/2014 | Fujimoto | |
| 2016/0231021 A1* | 8/2016 | Roetker | F25B 17/02 |

FOREIGN PATENT DOCUMENTS

| | | |
|---|---|---|
| DE | 3238762 | 1/1984 |
| DE | 9420878 U1 | 2/1995 |
| EP | 0195382 A2 | 9/1986 |
| EP | 2600077 | 6/2013 |
| WO | 2013/171547 | 11/2013 |

OTHER PUBLICATIONS

Institute of Atmospheric and Climate Science—IACETH, "Evaporation," publicly available prior to Jun. 24, 2016 (10 pages).

* cited by examiner

*Primary Examiner* — Lois L Zheng

(74) *Attorney, Agent, or Firm* — Michael Best & Friedrich LLP

(57) ABSTRACT

A heat exchanger management system and a method of operating the heat exchanger management system. In one embodiment, the heat exchanger management system includes a memory and an electronic processor electrically connected to the memory and configured to operate one or more burners to transmit heat to a heat exchanger for a first period of time that deposits corrosive condensates on a passivation layer of the heat exchanger, deactivate the one or more burners for a second period of time, operate one or more blowers to move air across the heat exchanger at a temperature that evaporates the corrosive condensates on the passivation layer of the heat exchanger and increases an oxide thickness of the passivation layer on the heat exchanger, and reactivate the one or more burners after the second period of time.

11 Claims, 3 Drawing Sheets

MANAGING A PASSIVATION LAYER OF A HEAT EXCHANGER

FIELD

The invention generally relates to heat exchangers, and more particularly to a method of operating a heat exchanger.

BACKGROUND

Modern wall-hanging boilers burn natural gas and use the hot exhaust gas to heat water which circulates through radiators in different rooms to provide central heating for residential houses. The efficiency of such boilers may be as high as 95 to 99 percent depending on the water flow temperatures. However, sulfur contained in the fuel gas (e.g., natural gas) is oxidized during the combustion process and converted into sulfuric acid which corrodes the heat exchanger fins (or pins) once the acid condenses on the fin surface. Corrosion products deposit and accumulate in the narrow gaps between the fins (or pins) of the compact heat exchanger. Exhaust gas flow passage is hindered and the efficiency of the boiler may be reduced by more than 10 percent after as little as five thousand hours of operation.

SUMMARY

Conventional wall-hanging boilers having a compact heat exchanger that require bi-annual maintenance. To perform the maintenance, a service person manually removes the corrosion products accumulated in the heat exchanger. Thus, there is a need for a heat exchanger management system and a method of operating the heat exchanger management system that reduces or eliminates the bi-annual maintenance.

Other systems have proposed providing automated maintenance mechanisms to remove the corrosion products accumulated in the heat exchanger. For example, European Patent Publication No. 2 600 077, published Jun. 5, 2013, describes a system that periodically applies a routine that cools the heat exchanger by reducing the output of the burner, increasing the output of a fan, and cycling cooler liquid through the heat exchanger. This decrease in temperature causes an increase in moisture from condensation and the increased liquid moisture "washes" corrosive condensates and corrosion products off of the heat exchanger. However, in various embodiments, the systems and method described below provide certain advantages over approaches that might require increased levels of moisture or intentional controlled decreases in temperature.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to systems and methods for controllably cycling the operation of the burner of a heat exchanger system, such as, for example, a wall-hanging boiler, to reduce corrosion of the heat exchanger surfaces and manage the thickness of the oxide layer.

One embodiment includes a method of operating a heat exchanger management system. The method includes operating, by the heat exchanger management system, one or more burners to transmit heat to a heat exchanger for a first period of time, wherein operating the one or more burners to transmit heat to the heat exchanger for the first period of time deposits corrosive condensates on a passivation layer of a heat exchanger. The method also includes deactivating, by the heat exchanger management system, the one or more burners for a second period of time. Responsive to the deactivating of the one or more burners, the heat exchanger management system operates one or more blowers to move air across the heat exchanger at a temperature that evaporates the corrosive condensates on the heat exchanger and increases an oxide thickness of the passivation layer on the heat exchanger. After the second period of time, the heat exchanger management system reactivates the one or more burners.

Another embodiment provides a heat exchanger system that includes a heat exchanger with a passivation layer formed on at least one surface of the heat exchanger, at least one burner positioned to apply heat to the heat exchanger, and a blower positioned to blow air across the heat exchanger, and an electronic processor configured to control the operation of the system. The electronic processor operates the one or more burners to transmit heat to a heat exchanger for a first period of time. The operation of the one or more burners deposits corrosive condensates on a passivation layer of the heat exchanger. After expiration of the first period of time, the electronic controller deactivates the one or more burners for a second period of time and operates the one or more blowers to move air across the heat exchanger at a temperature that evaporates the corrosive condensates on the passivation layer of the heat exchanger and increases an oxide thickness of the passivation layer on the heat exchanger. After expiration of the second period of time, the electronic processor reactivates the one or more burners after the second period of time.

The details of one or more features, aspects, implementations, and advantages of this disclosure are set forth in the accompanying drawings, the detailed description, and the claims below.

DETAILED DESCRIPTION

One or more specific embodiments will be described below. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
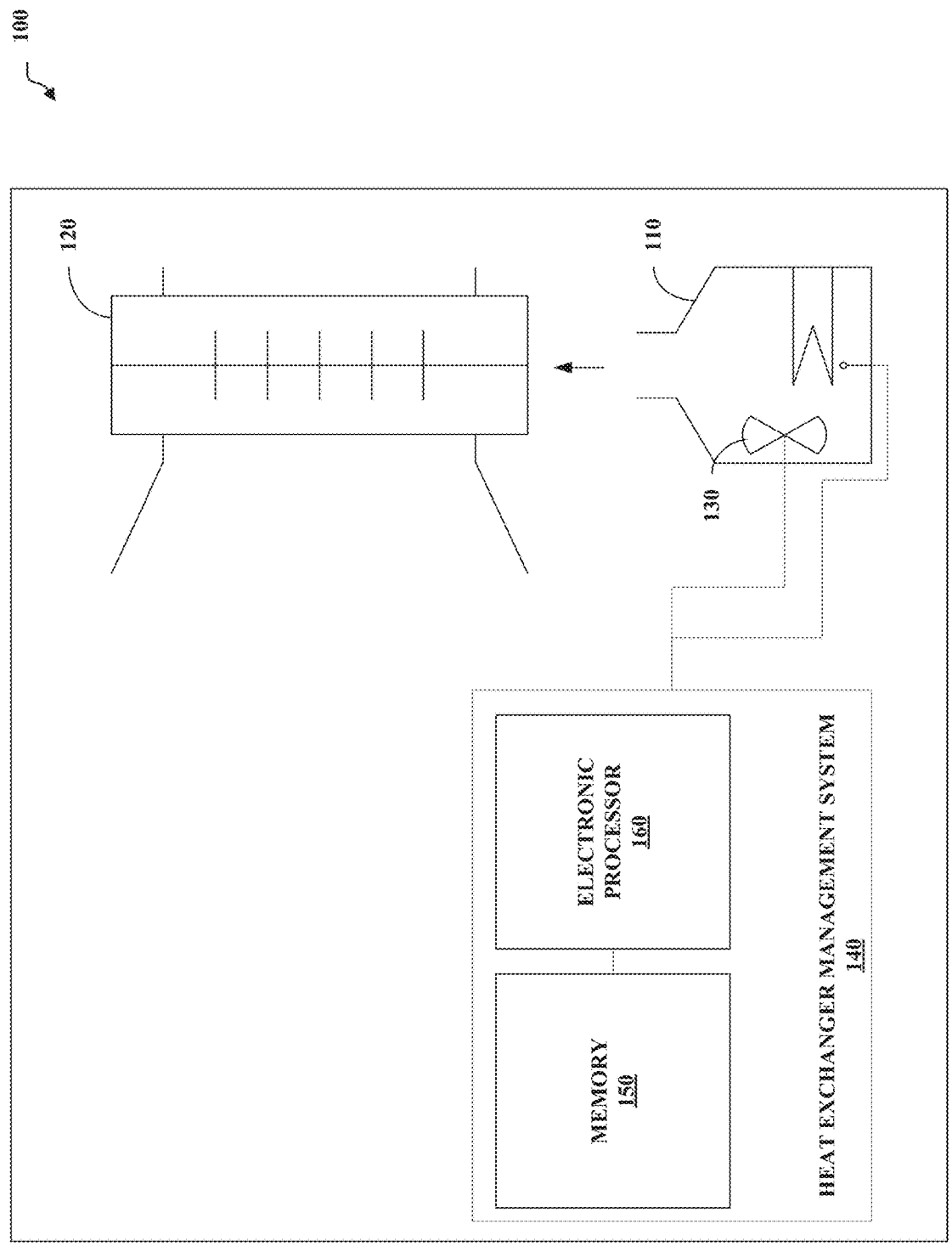
FIG. 1 is a diagram representing a heat exchanger system configured to perform the techniques disclosed herein, in accordance with some embodiments.

An embodiment of a heat exchanger system 100, such as, for example, a wall-hanging boiler system, is shown in FIG. 1. The heat exchanger system 100 includes one or more burners 110, a heat exchanger 120 configured to allow a fluid to pass internally through the heat exchanger 120 and also configured to receive heat provided by the operation of the burner 110, one or more blowers 130 configured to force air over an external surface of the heat exchanger 120, and a heat exchanger management system 140. In the illustrated embodiment, the one or more blowers 130 are part of the one or more burners 110.

Alternatively, in some embodiments, the one or more blowers 130 are external to the one or more burners 110 and are located adjacent to fins of the heat exchangers 120.

In some implementations, the heat exchanger 120 includes a single flow channel that allows fluid to pass internally through the heat exchanger 120 while the hot exhaust gas generated by the one or more burners 110 is blown across an external surface of the heat exchanger to heat the fluid passing through the flow channel. Some such implementations also include one or more "fins" or other geometric structures formed on the external surface of the heat exchanger 120 to increase the surface area and to further improve the conductance of heat from the hot exhaust gas to the fluid moving through the heat exchanger 120.

In other implementations, the heat exchanger 120 includes two flow channels separated by a solid media or wall. The hot exhaust gas from the one or more burners 110 moves through the first flow channel while the fluid to be heated moves through the second flow channel. Heat is transferred from the hot exhaust gas moving in the first flow channel to the fluid in the second flow channel through the solid media wall separating the two channels.

In view of these and other types of heat exchangers that may be implemented as the heat exchanger 120 of FIG. 1, the term "external surface" or "exterior surface" as used herein refer to a surface of the heat exchanger that is external to a flow channel through which the fluid being heated is moving. For example, in implementations where the heat exchanger includes only a single internal flow channel, the "external surface" or "exterior surface" may include a external surface of the flow channel and/or a surface of the "fins" positioned to increase the surface area. Similarly, in implementations where the heat exchanger includes two flow channels—one for hot exhaust and the other for fluid—the "external surface" or "exterior surface" may include a surface of the solid media wall separating the two flow channels that is exposed to the hot exhaust flow channel and/or other surfaces within the hot exhaust flow channel.

In some embodiments, an external surface of the heat exchanger 120 comprises aluminum. In some embodiments, the external surface of the heat exchanger 120 comprises an aluminum alloy. In certain embodiments the external surface of the heat exchanger 120 comprises an aluminum oxide. For example, the external surface of the heat exchanger 120 comprises alumina (alpha-$Al_2O_3$). In some embodiments, the fluid passing internally through the heat exchanger 120 includes water. In various embodiments, the heat exchanger management system 140 includes a memory 150 and an electronic processor 160.

In the example of FIG. 1, a memory 150 of the heat exchanger management system 140 stores computer-readable instructions that, when executed by the electronic processor 160 of the heat exchanger management system 140, cause the heat exchanger management system and, more particularly the electronic processor 160, to perform or control the performance of various functions or methods attributed to heat exchanger management system 140 herein (e.g., regulate the operation of the heat exchanger system, determine the presence of flue gas condensates). In some embodiments the heat exchanger management system 140 regulates the operation of the one or more burners 110 and one or more blowers 130 as described in further detail below. The memory 150 may include any transitory, non-transitory, volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital or analog media. The functions attributed to the heat exchanger management system 140 herein may be embodied as software, firmware, hardware or any combination thereof.

Various thermally conductive materials (e.g. aluminum, aluminum alloys) may be used to form part or all of the heat exchanger 120. In some embodiments, the external surface of the heat exchanger 120 includes a base layer comprising aluminum or aluminum alloys and during exposure to air a portion of the aluminum will oxidize to form a passivation layer (e.g. alumina (alpha-$Al_2O_3$), aluminum(I) oxide ($Al_2O$), aluminum(II) oxide (AlO), aluminum(III) hydroxide ($Al(OH)_3$), Basaluminite ($Al_4(SO_4)(OH)_{10}$.$4$-$5H_2O$, and aluminum(III) oxide ($Al_2O_3$)) on the external surface of the base layer of the heat exchanger 120.

In various embodiments, the one or more burners 110 are fueled by a gaseous hydrocarbon (e.g., natural gas). The natural gas stream supplied to most homes and businesses includes a mixture of methane and other compounds. Sulfur and sulfurous compounds are commonly found in the natural gas stream (e.g., impurities, odorous additives, or other sulfurous compounds). During operation of the one or more burners 110, the sulfur and sulfurous compounds may be oxidized during the combustion process. The resulting sulfurous oxides ($SO_x$) may react with water in the atmosphere of the heat exchanger system 100 to form acids (e.g. sulfuric acid ($H_2SO_4$)) which can condense onto the external surface of the heat exchanger 120. The resulting acidic condensates may corrode the external surface of the heat exchanger 120 causing a decrease in the operational efficiency of the heat exchanger 120 and the heat exchanger system 100. The acidic condensates can also form a deposit layer that can obstruct movement of air over the heat exchanger 120 and of exhaust gases leaving the system.

Figure 2:
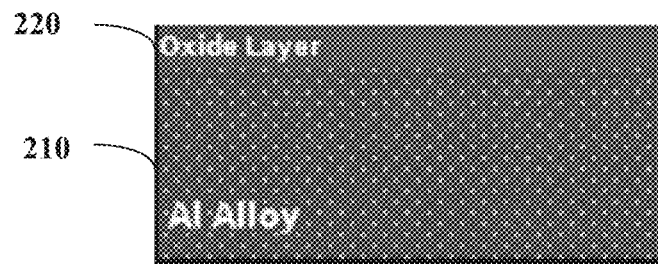
FIG. 2 is a cross-sectional diagram of a portion of the passivation layer and a base layer of a heat exchanger, in accordance with some embodiments.
Figure 3:
FIG. 3 is a cross-sectional diagram of a portion of the passivation layer and the base layer of a heat exchanger including deposited corrosive condensates on the passivation layer, in accordance with some embodiments.

FIGS. 2-5 illustrate a process of managing a protective passivation layer 220 during the operation of a burner. FIG. 2 shows the external surface of the heat exchanger 120 prior to contact with condensates and includes a base layer 210 and a passivation layer 220 (e.g., an aluminum oxide). As shown in FIG. 3, condensates 230 deposited on the passivation layer 220 above the base layer 210 can cause dissolution (i.e. corrosion) of the passivation layer 220.

Figure 4:
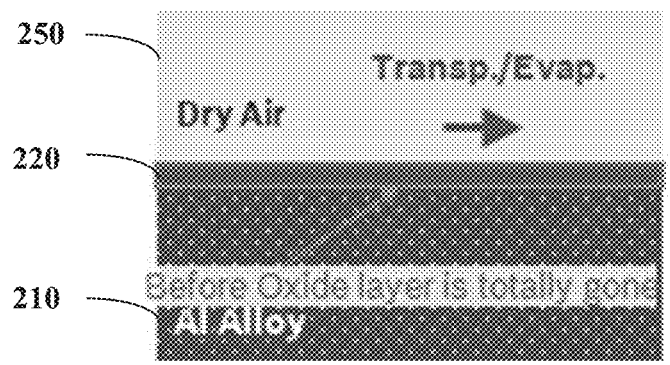
FIG. 4 is a cross-sectional diagram of a portion of the remaining passivation layer and the base layer of a heat exchanger after the corrosive condensates have been evaporated by air, in accordance with some embodiments.
Figure 5:
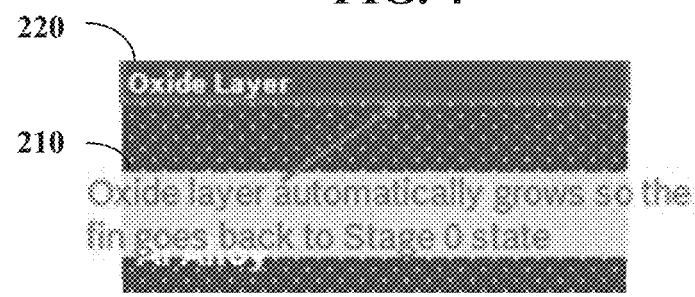
FIG. 5 is a cross-sectional diagram of a portion of the passivation layer and the base layer of a heat exchanger after the passivation layer has been increased by air, in accordance with some embodiments.

As discussed in further detail below, to manage the passivation layer 220 (e.g., prevent complete dissolution of the passivation layer 220), the heat exchange management system 140 temporarily stops the operation of the burner 110 and continues to blow air across the surface of the heat exchanger 120. As a result, corrosive condensates on the surface of the passivation layer 220 either are blown away by the one or more blowers 130 or evaporate. As illustrated in FIG. 4, the remaining passivation layer 220 is then exposed to air 250 causing an increase in the thickness of the remaining passivation layer 220. As shown in FIG. 5, this process increases the thickness of the passivation layer 220 to a previous oxide thickness (e.g., the oxide thickness prior to the deposition of corrosive condensates).

In some embodiments, the passivation layer 220 is an aluminum oxide, and the aluminum oxide typically dissolves more slowly in acid (e.g., the condensed acids 230) than the aluminum metal in the base layer 210. Accordingly, the passivation layer 220 provides a barrier between the condensed acids 230 and the base layer 210. In some embodiments, the thickness of the passivation layer 220 may be at least about 3 nanometers, at least about 4 nanometers, less than about 10 nanometers, less than about 8 nanometers, less than about 7 nanometers, and other suitable thicknesses.

During operation of the burner 110 the condensed acids 230 slowly dissolve the passivation layer 220 on the base layer 210 as illustrated in FIGS. 2-5. Complete dissolution (e.g., corrosion) of the passivation layer 220 would allow the acid to contact and rapidly dissolve the base layer 210. To prevent this, the operation of the one or more burners 110 is temporarily discontinued by the heat exchanger management system 140 to allow the condensates to evaporate and, in some implementations, to cause the passivation layer 220 to reform to the thickness prior to contact with acidic condensates 230.

In some embodiments, the one or more burners 110 are operated for a first defined period of time at the end of which the one or more burners 110 are deactivated for a second defined period of time. The second period of time may be chosen to allow the accumulated condensates 230 deposited during the first period of time to completely evaporate and allow the passivation layer 220 at least partially dissolved during the first period of time to reform.

In the example described herein, the first period of time is defined as approximately 2 hours and the second period of time is defined as 30 seconds. Accordingly, the heat exchanger management system 140 operates the burner 110 to heat the liquid moving through the heat exchanger 120 for 2 hours and then turns off (or decreases the output) the burner 110 for 30 seconds while operating the fan to blow off and evaporate the condensates that have been deposited on the heat exchanger 120 during the prior two hours. After 30 seconds, the heat exchanger management system 140 reactivates the burner 110 to continue to heat the heat exchanger 120. However, in other embodiments, the defined duration of the first and second time periods can be defined differently (for example, based on the fuel source for the burner 110, the geometry of the heat exchanger 120, the application of the heat exchanger system 100) and, in still other embodiments, can be defined as variable or adaptable time periods.

In some embodiments, during at least a portion of the second period of time the blower 130 provides forced air 250 over the passivation layer 220 of the heat exchanger 120 in order to enhance the evaporation rate of the condensates and/or help remove the condensate layer and droplets by shear force and manage the thickness of the passivation layer 220. In certain embodiments, the one or more blowers 130 provide forced air 250 over the surface of the heat exchanger 120 for a period at least temporally corresponding to the second period of time. In another embodiment, the blower 130 may provide forced air 250 over the surface of the heat exchanger 120 at times other than the second period of time.

Additionally, in other embodiments, the heat exchanger system 100 includes one or more sensors (e.g. conductivity, optical) that are able to detect the presence of condensates (e.g., the condensed acids 230) on the surface of the heat exchanger 120. The heat exchanger management system 140 can receive one or more signals from the one or more sensors indicative of the presence and/or amount of condensates present on the surface of the heat exchanger 120. The heat exchanger management system 140 can regulate the operation of the burner 110 and blower 130 by comparing the accumulation of the acidic condensates and/or the passivation layer 220 (e.g., aluminum oxide barrier layer) to a threshold stored in the memory 150. Upon reaching the threshold, the heat exchanger management system 140 deactivates the one or more burners 110 and operates the blower 130 to evaporate the acidic condensates and increases the passivation layer 220. In this way, the heat exchanger management system 140 reduces the corrosive load and manages the passivation layer on the surface of the heat exchanger 120.

Figure 6:
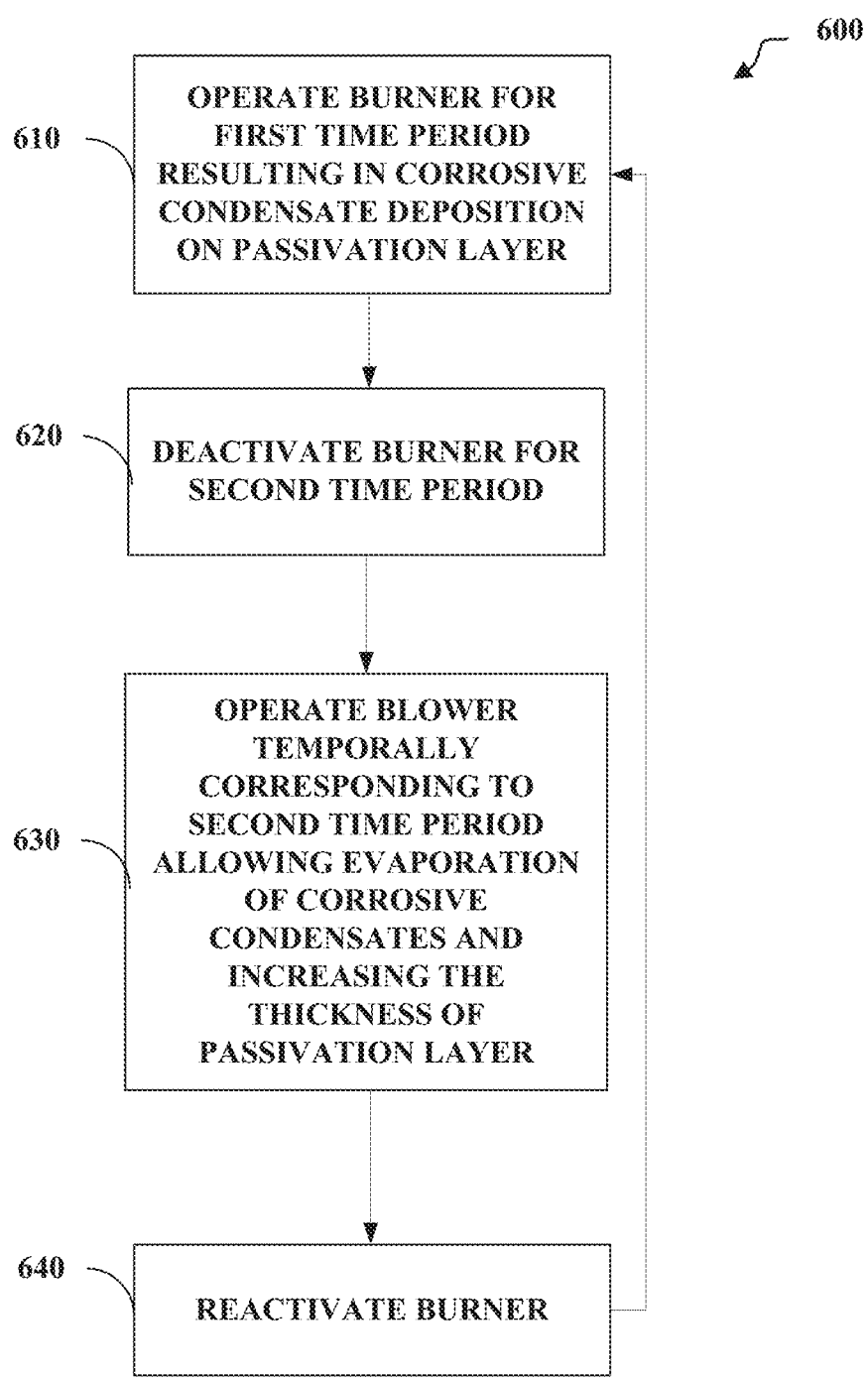
FIG. 6 is a flowchart of a method of reducing the corrosion of a heat exchanger, in accordance with some embodiments.

FIG. 6 is a flowchart of a method of reducing corrosion and managing a passivation layer thickness in a heat exchanger system 600. In the example of FIG. 6, at block 610, the heat exchanger management system 140 operates the one or more burners 110 for a first period of time resulting in corrosive condensates being deposited on the passivation layer 220 of the heat exchanger 120. At block 620, the heat exchanger management system 140 deactivates the one or more burners 110 for a second period of time. At block 630, the heat exchanger management system 140 operates the one or more blowers 130 for a period of time temporally corresponding to the second period of time allowing evaporation of the corrosive condensates and increasing the thickness of the remaining passivation layer 220. At block 640, the heat exchanger management system 140 reactivates the one or more burners 110 after the second period of time.

In at least some embodiments, the temperature of the heat exchanger 120 is not significantly lowered during the second period of time (i.e., at blocks 620 and 630). Instead, the temperature during the evaporation process remains at a level above a dew point of the combustion gas so that significant additional condensation is not deposited on the heat exchanger 120 during the evaporation/passivation-layer-re-growing process.

While the invention has been described with reference to various embodiments, it will be understood that these embodiments are illustrative and that the scope of the disclosure is not limited to them. Many variations, modifications, additions, and improvements are possible. More generally, embodiments in accordance with the invention have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of operating a heat exchanger management system, the method comprising:
   operating, by the heat exchanger management system, one or more burners to transmit heat to a heat exchanger for a first period of time, wherein operating the one or more burners to transmit heat to the heat exchanger for the first period of time deposits corrosive condensates on a passivation layer of a heat exchanger;

deactivating, by the heat exchanger management system, the one or more burners for a second period of time;

responsive to the deactivating of the one or more burners, operating, by the heat exchanger management system, one or more blowers to move air across the heat exchanger at a temperature that causes the corrosive condensates on the heat exchanger to evaporate and, after evaporation of the corrosive condensates, increases an oxide thickness of the passivation layer on the heat exchanger; and reactivating, by the heat exchanger management system, the one or more burners after the second period of time.

2. The method of claim 1, wherein the first period of time is approximately 120 minutes and wherein the second period of time is approximately 30 seconds.

3. The method of claim 1, wherein the first period of time is between 60 minutes and 180 minutes.

4. The method of claim 1, wherein the second period of time is between 20 seconds and 40 seconds.

5. The method of claim 1, wherein the passivation layer of the heat exchanger comprises an aluminum oxide selected from the list consisting of aluminum(I) oxide ($Al_2O$), aluminum(II) oxide (AlO), aluminum(III) hydroxide (Al$(OH)_3$)), Basaluminite ($Al_4(SO_4)(OH)_{10} \cdot 4\text{-}5H_2O$), and aluminum(III) oxide ($Al_2O_3$).

6. The method of claim 1, wherein the oxide thickness of the passivation layer is between 3 and 10 nanometers.

7. The method of claim 1, wherein the oxide thickness is between 1 nanometer and 2 nanometers after the first period of time.

8. The method of claim 7, wherein the oxide thickness is increased to between 3 nanometers and 10 nanometers by the end of the second period of time.

9. The method of claim 1, wherein the temperature of the air moving across the heat exchanger remains above a dew point of a combustion gas from the one or more burners during the second period of time.

10. A method of operating a heat exchanger system, the method comprising:

operating a burner to apply heat to a heat exchanger for a period of approximately 120 minutes, wherein operating the burner generates a combustion gas that deposits a corrosive condensate on a surface of the heat exchanger;

after expiration of the period of approximately 120 minutes, deactivating the burner for period of approximately 30 seconds while operating a blower to move air across the heat exchanger at a temperature above a dew point of the combustion gas; and after expiration of the period of approximately 30 seconds, reactivating the burner to apply heat to the heat exchanger.

11. The method of claim 10, wherein operating the blower to move air across the heat exchanger causes the corrosive condensates deposited on the surface of the heat exchanger to blow off or evaporate.

* * * * *